United States Patent
Albert Hu

(10) Patent No.: US 8,964,747 B2
(45) Date of Patent: *Feb. 24, 2015

(54) SYSTEM AND METHOD FOR RESTRICTING NETWORK ACCESS USING FORWARDING DATABASES

(75) Inventor: Tyng Jar Albert Hu, Pleasanton, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/370,562

(22) Filed: Feb. 12, 2009

(65) Prior Publication Data

US 2010/0040059 A1    Feb. 18, 2010

Related U.S. Application Data

(63) Continuation of application No. 11/417,993, filed on May 3, 2006, now Pat. No. 7,558,266.

(51) Int. Cl.
*H04L 12/28* (2006.01)
*H04L 12/56* (2006.01)
*H04J 3/16* (2006.01)
(Continued)

(52) U.S. Cl.
CPC ......... *H04L 61/2015* (2013.01); *H04L 49/3009* (2013.01); *H04L 49/35* (2013.01); *H04L 49/354* (2013.01); *H04L 63/02* (2013.01)
USPC .......................................... 370/392; 370/469

(58) Field of Classification Search
CPC .... H04L 51/12; H04L 63/0236; H04L 45/745
USPC ............... 370/389, 395.53, 395.52, 392, 469; 709/203, 224; 455/410, 411, 428, 429
See application file for complete search history.

(56) References Cited

U.S. PATENT DOCUMENTS

| | | | |
|---|---|---|---|
| 3,641,433 | A | 2/1972 | Mifflin et al. |
| 4,168,400 | A | 9/1979 | De Couasnon et al. |

(Continued)

FOREIGN PATENT DOCUMENTS

| | | | |
|---|---|---|---|
| EP | 0 992 921 A2 | 4/2000 | |
| EP | 1 542 409 A | 6/2005 | |

(Continued)

OTHER PUBLICATIONS

Acampora and Winters, "A Wireless Network for Wide-Band Indoor Communications," IEEE Journal on selected Areas in Communications, vol. SAC-5, No. 5, Jun. 1987, pp. 796-804.

(Continued)

*Primary Examiner* — Hoang-Chuong Vu

(57) ABSTRACT

This specification describes a system that can offer, among other advantages, dynamically allowing or rejecting non-DHCP packets entering a switch. In addition, a FDB is commonly used by a bridge or switch to store an incoming packet's source MAC address and its port number, then later on if the destination MAC address of another incoming packet matching any entry in FDB will be forwarded to its associated port. Using the techniques described herein, not only this will be completely transparent to user, the techniques can also result in an increase in switch performance by blocking unwanted traffic at an earlier stage of forwarding process and freeing up other processing units at a later stage, like switch fabric or packet processing stages.

19 Claims, 5 Drawing Sheets

(51) Int. Cl.
*H04J 3/22* (2006.01)
*H04L 29/12* (2006.01)
*H04L 29/06* (2006.01)
*H04L 12/935* (2013.01)
*H04L 12/931* (2013.01)

(56) References Cited

U.S. PATENT DOCUMENTS

| | | |
|---|---|---|
| 4,176,316 A | 11/1979 | DeRoas et al. |
| 4,247,908 A | 1/1981 | Lockart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,575 A | 2/1993 | Lim |
| 5,231,633 A | 7/1993 | Hluchy et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,444,851 A | 8/1995 | Woest |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,734,699 A | 3/1998 | Lu et al. |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,862,475 A | 1/1999 | Zicker et al. |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A * | 10/1999 | Lowry et al. .................. 370/353 |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown et al. |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | De Vries |
| 6,078,568 A | 6/2000 | Wright |
| 6,088,591 A | 7/2000 | Trompower et al. |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,649 B1 | 2/2001 | Birukawa et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,240,291 B1 | 5/2001 | Narasimhan et al. |
| 6,246,751 B1 | 6/2001 | Bergl et al. |
| 6,249,252 B1 | 6/2001 | Dupray |

(56) References Cited

U.S. PATENT DOCUMENTS

| | | |
|---|---|---|
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watannabe |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,574,240 B1 | 6/2003 | Tzeng |
| 6,580,700 B1 | 6/2003 | Pinard et al. |
| 6,587,680 B1 | 7/2003 | Ala-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,650,912 B2 | 11/2003 | Chen et al. |
| 6,658,389 B1 | 12/2003 | Alpdemir |
| 6,659,947 B1 | 12/2003 | Carter et al. |
| 6,661,787 B1 | 12/2003 | O'Connell et al. |
| 6,674,403 B2 | 1/2004 | Gray et al. |
| 6,677,894 B2 | 1/2004 | Sheynblat et al. |
| 6,678,516 B2 | 1/2004 | Nordman et al. |
| 6,678,802 B2 | 1/2004 | Hickson |
| 6,687,498 B2 | 2/2004 | McKenna et al. |
| 6,697,415 B1 | 2/2004 | Mahany |
| 6,721,334 B1 | 4/2004 | Ketcham |
| 6,725,260 B1 | 4/2004 | Philyaw |
| 6,738,629 B1 | 5/2004 | McCormick et al. |
| 6,747,961 B1 | 6/2004 | Ahmed et al. |
| 6,756,940 B2 | 6/2004 | Oh et al. |
| 6,760,324 B1 | 7/2004 | Scott et al. |
| 6,785,275 B1 | 8/2004 | Boivie et al. |
| 6,798,788 B1 * | 9/2004 | Viswanath et al. ............ 370/469 |
| 6,801,782 B2 | 10/2004 | McCrady et al. |
| 6,826,399 B1 | 11/2004 | Hoffman et al. |
| 6,839,338 B1 | 1/2005 | Amara et al. |
| 6,839,348 B2 | 1/2005 | Tang et al. |
| 6,839,388 B2 | 1/2005 | Vaidyanathan |
| 6,847,620 B1 | 1/2005 | Meier |
| 6,847,892 B2 | 1/2005 | Zhou et al. |
| 6,856,800 B1 | 2/2005 | Henry et al. |
| 6,879,812 B2 | 4/2005 | Agrawal et al. |
| 6,901,439 B1 | 5/2005 | Bonasia et al. |
| 6,917,688 B2 | 7/2005 | Yu et al. |
| 6,934,260 B1 * | 8/2005 | Kanuri ............ 370/255 |
| 6,937,566 B1 | 8/2005 | Forslow |
| 6,938,079 B1 | 8/2005 | Anderson et al. |
| 6,957,067 B1 | 10/2005 | Iyer et al. |
| 6,973,622 B1 | 12/2005 | Rappaport et al. |
| 6,978,301 B2 | 12/2005 | Tindal |
| 6,980,533 B1 | 12/2005 | Abraham et al. |
| 6,985,469 B2 | 1/2006 | Leung |
| 6,993,683 B2 | 1/2006 | Bhat et al. |
| 6,996,630 B1 | 2/2006 | Masaki et al. |
| 7,013,157 B1 | 3/2006 | Norman et al. |
| 7,020,438 B2 | 3/2006 | Sinivaara et al. |
| 7,020,773 B1 | 3/2006 | Otway et al. |
| 7,024,199 B1 | 4/2006 | Massie et al. |
| 7,024,394 B1 | 4/2006 | Ashour et al. |
| 7,027,773 B1 | 4/2006 | McMillin |
| 7,031,705 B2 | 4/2006 | Grootwassink |
| 7,035,220 B1 | 4/2006 | Simcoe |
| 7,039,037 B2 | 5/2006 | Wang et al. |
| 7,058,414 B1 | 6/2006 | Rofheart et al. |
| 7,062,566 B2 | 6/2006 | Amara et al. |
| 7,068,999 B2 | 6/2006 | Ballai |
| 7,079,537 B1 | 7/2006 | Kanuri et al. |
| 7,089,322 B1 | 8/2006 | Stallmann |
| 7,092,529 B2 | 8/2006 | Yu et al. |
| 7,110,756 B2 | 9/2006 | Diener |
| 7,116,979 B2 | 10/2006 | Backes et al. |
| 7,126,913 B1 | 10/2006 | Patel et al. |
| 7,134,012 B2 | 11/2006 | Doyle et al. |
| 7,139,829 B2 | 11/2006 | Wenzel et al. |
| 7,142,867 B1 | 11/2006 | Gandhi et al. |
| 7,146,166 B2 | 12/2006 | Backes et al. |
| 7,155,236 B2 | 12/2006 | Chen et al. |
| 7,155,518 B2 | 12/2006 | Forslow |
| 7,158,777 B2 | 1/2007 | Lee et al. |
| 7,159,016 B2 | 1/2007 | Baker |
| 7,221,927 B2 | 5/2007 | Kolar et al. |
| 7,224,970 B2 | 5/2007 | Smith et al. |
| 7,239,862 B1 | 7/2007 | Clare et al. |
| 7,246,243 B2 | 7/2007 | Uchida |
| 7,263,366 B2 | 8/2007 | Miyashita |
| 7,274,730 B2 | 9/2007 | Nakabayashi |
| 7,280,495 B1 | 10/2007 | Zweig et al. |
| 7,290,051 B2 | 10/2007 | Dobric et al. |
| 7,293,136 B1 | 11/2007 | More et al. |
| 7,310,664 B1 | 12/2007 | Merchant et al. |
| 7,317,914 B2 | 1/2008 | Adya et al. |
| 7,320,070 B2 | 1/2008 | Baum |
| 7,324,468 B2 | 1/2008 | Fischer |
| 7,324,487 B2 | 1/2008 | Saito |
| 7,324,489 B1 | 1/2008 | Iyer et al. |
| 7,349,412 B1 | 3/2008 | Jones et al. |
| 7,350,077 B2 | 3/2008 | Meier et al. |
| 7,359,676 B2 | 4/2008 | Hrastar |
| 7,370,362 B2 | 5/2008 | Olson et al. |
| 7,376,080 B1 | 5/2008 | Riddle et al. |
| 7,379,423 B1 * | 5/2008 | Caves et al. ............ 370/232 |
| 7,379,475 B2 * | 5/2008 | Minami et al. ............ 370/469 |
| 7,382,756 B2 | 6/2008 | Barber et al. |
| 7,417,953 B2 | 8/2008 | Hicks et al. |
| 7,421,248 B1 | 9/2008 | Laux et al. |
| 7,421,487 B1 | 9/2008 | Peterson et al. |
| 7,440,416 B2 | 10/2008 | Mahany et al. |
| 7,443,823 B2 | 10/2008 | Hunkeler et al. |
| 7,447,502 B2 | 11/2008 | Buckley |
| 7,451,316 B2 | 11/2008 | Halasz et al. |
| 7,460,855 B2 | 12/2008 | Barkley et al. |
| 7,466,678 B2 | 12/2008 | Cromer et al. |
| 7,475,130 B2 | 1/2009 | Silverman |
| 7,477,894 B1 | 1/2009 | Sinha |
| 7,480,264 B1 | 1/2009 | Duo et al. |
| 7,483,390 B2 | 1/2009 | Rover et al. |
| 7,489,648 B2 | 2/2009 | Griswold |
| 7,493,407 B2 | 2/2009 | Leedom et al. |
| 7,505,434 B1 | 3/2009 | Backes |
| 7,509,096 B2 | 3/2009 | Palm et al. |
| 7,529,925 B2 | 5/2009 | Harkins |
| 7,551,574 B1 | 6/2009 | Peden, II et al. |
| 7,551,619 B2 | 6/2009 | Tiwari |
| 7,558,266 B2 | 7/2009 | Hu |
| 7,570,656 B2 | 8/2009 | Raphaeli et al. |
| 7,573,859 B2 | 8/2009 | Taylor |
| 7,577,453 B2 | 8/2009 | Matta |
| 7,592,906 B1 | 9/2009 | Hanna et al. |

(56) References Cited

U.S. PATENT DOCUMENTS

| | | | |
|---|---|---|---|
| 7,603,119 B1 | 10/2009 | Durig et al. | |
| 7,636,363 B2 | 12/2009 | Chang et al. | |
| 7,665,132 B2* | 2/2010 | Hisada et al. | 726/15 |
| 7,680,501 B2 | 3/2010 | Sillasto et al. | |
| 7,693,526 B2 | 4/2010 | Qian et al. | |
| 7,715,432 B2 | 5/2010 | Bennett | |
| 7,716,379 B2 | 5/2010 | Ruan et al. | |
| 7,724,703 B2 | 5/2010 | Matta et al. | |
| 7,724,704 B2 | 5/2010 | Simons et al. | |
| 7,729,278 B2 | 6/2010 | Chari et al. | |
| 7,733,868 B2 | 6/2010 | Van Zijst | |
| 7,746,897 B2 | 6/2010 | Stephenson et al. | |
| 7,788,475 B2 | 8/2010 | Zimmer et al. | |
| 7,805,529 B2 | 9/2010 | Galluzzo et al. | |
| 7,817,554 B2 | 10/2010 | Skog et al. | |
| 7,844,298 B2 | 11/2010 | Riley | |
| 7,865,713 B2 | 1/2011 | Chesnutt et al. | |
| 7,873,061 B2 | 1/2011 | Gast et al. | |
| 7,894,852 B2 | 2/2011 | Hansen | |
| 7,912,982 B2 | 3/2011 | Murphy | |
| 7,920,548 B2* | 4/2011 | Lor et al. | 370/352 |
| 7,929,922 B2 | 4/2011 | Kubo | |
| 7,945,399 B2 | 5/2011 | Nosovitsky et al. | |
| 7,986,940 B2 | 7/2011 | Lee et al. | |
| 8,019,082 B1 | 9/2011 | Wiedmann et al. | |
| 8,116,275 B2 | 2/2012 | Matta et al. | |
| 8,150,357 B2 | 4/2012 | Aragon | |
| 2001/0007567 A1* | 7/2001 | Ando et al. | 370/469 |
| 2001/0024953 A1 | 9/2001 | Balogh | |
| 2002/0021701 A1 | 2/2002 | Lavian et al. | |
| 2002/0052205 A1 | 5/2002 | Belostotsky et al. | |
| 2002/0060995 A1 | 5/2002 | Cervello et al. | |
| 2002/0062384 A1 | 5/2002 | Tso | |
| 2002/0069278 A1 | 6/2002 | Forslow | |
| 2002/0078361 A1 | 6/2002 | Giroux et al. | |
| 2002/0080790 A1 | 6/2002 | Beshai | |
| 2002/0087699 A1 | 7/2002 | Karagiannis et al. | |
| 2002/0094824 A1 | 7/2002 | Kennedy et al. | |
| 2002/0095486 A1 | 7/2002 | Bahl | |
| 2002/0101868 A1 | 8/2002 | Clear et al. | |
| 2002/0116655 A1 | 8/2002 | Lew et al. | |
| 2002/0157020 A1 | 10/2002 | Royer | |
| 2002/0174137 A1 | 11/2002 | Wolff et al. | |
| 2002/0176437 A1 | 11/2002 | Busch et al. | |
| 2002/0188756 A1 | 12/2002 | Weil et al. | |
| 2002/0191572 A1 | 12/2002 | Weinstein et al. | |
| 2002/0194251 A1 | 12/2002 | Richter et al. | |
| 2003/0014646 A1 | 1/2003 | Buddhikot et al. | |
| 2003/0018889 A1 | 1/2003 | Burnett et al. | |
| 2003/0043073 A1 | 3/2003 | Gray et al. | |
| 2003/0055959 A1 | 3/2003 | Sato | |
| 2003/0107590 A1 | 6/2003 | Levillain et al. | |
| 2003/0120764 A1 | 6/2003 | Laye et al. | |
| 2003/0133450 A1 | 7/2003 | Baum | |
| 2003/0134642 A1 | 7/2003 | Kostic et al. | |
| 2003/0135762 A1 | 7/2003 | Macaulay | |
| 2003/0156586 A1 | 8/2003 | Lee et al. | |
| 2003/0174706 A1 | 9/2003 | Shankar et al. | |
| 2003/0193910 A1 | 10/2003 | Shoaib et al. | |
| 2003/0204596 A1 | 10/2003 | Yadav | |
| 2003/0227934 A1 | 12/2003 | White et al. | |
| 2004/0002343 A1 | 1/2004 | Brauel et al. | |
| 2004/0003285 A1 | 1/2004 | Whelan et al. | |
| 2004/0019857 A1 | 1/2004 | Teig et al. | |
| 2004/0025044 A1 | 2/2004 | Day | |
| 2004/0029580 A1 | 2/2004 | Haverinen et al. | |
| 2004/0030777 A1 | 2/2004 | Reedy et al. | |
| 2004/0030931 A1* | 2/2004 | Chamandy et al. | 713/201 |
| 2004/0038687 A1 | 2/2004 | Nelson | |
| 2004/0044749 A1 | 3/2004 | Harkin | |
| 2004/0047320 A1 | 3/2004 | Eglin | |
| 2004/0053632 A1 | 3/2004 | Nikkelen et al. | |
| 2004/0054569 A1 | 3/2004 | Pombo et al. | |
| 2004/0054774 A1 | 3/2004 | Barber et al. | |
| 2004/0054926 A1 | 3/2004 | Ocepek et al. | |
| 2004/0062267 A1 | 4/2004 | Minami et al. | |
| 2004/0064560 A1 | 4/2004 | Zhang et al. | |
| 2004/0068668 A1 | 4/2004 | Lor et al. | |
| 2004/0078598 A1 | 4/2004 | Barber et al. | |
| 2004/0093506 A1 | 5/2004 | Grawrock et al. | |
| 2004/0095914 A1 | 5/2004 | Katsube et al. | |
| 2004/0095932 A1 | 5/2004 | Astarabadi et al. | |
| 2004/0106403 A1 | 6/2004 | Mori et al. | |
| 2004/0111640 A1* | 6/2004 | Baum | 713/201 |
| 2004/0114546 A1 | 6/2004 | Seshadri et al. | |
| 2004/0119641 A1 | 6/2004 | Rapeli | |
| 2004/0120370 A1 | 6/2004 | Lupo | |
| 2004/0132438 A1* | 7/2004 | White | 455/418 |
| 2004/0143428 A1 | 7/2004 | Rappaport et al. | |
| 2004/0143755 A1* | 7/2004 | Whitaker et al. | 713/200 |
| 2004/0165545 A1 | 8/2004 | Cook | |
| 2004/0174900 A1 | 9/2004 | Volpi et al. | |
| 2004/0184475 A1 | 9/2004 | Meier | |
| 2004/0208570 A1 | 10/2004 | Reader | |
| 2004/0214572 A1 | 10/2004 | Thompson et al. | |
| 2004/0221042 A1 | 11/2004 | Meier | |
| 2004/0230370 A1 | 11/2004 | Tzamaloukas | |
| 2004/0233234 A1 | 11/2004 | Chaudhry et al. | |
| 2004/0236702 A1 | 11/2004 | Fink et al. | |
| 2004/0246937 A1 | 12/2004 | Duong et al. | |
| 2004/0246962 A1 | 12/2004 | Kopeikin et al. | |
| 2004/0252656 A1 | 12/2004 | Shiu et al. | |
| 2004/0255167 A1 | 12/2004 | Knight | |
| 2004/0259542 A1 | 12/2004 | Viitamaki et al. | |
| 2004/0259555 A1 | 12/2004 | Rappaport et al. | |
| 2004/0259575 A1 | 12/2004 | Perez-Breva et al. | |
| 2005/0015592 A1 | 1/2005 | Lin | |
| 2005/0021979 A1 | 1/2005 | Wiedmann et al. | |
| 2005/0025105 A1 | 2/2005 | Rue | |
| 2005/0026611 A1 | 2/2005 | Backes | |
| 2005/0030894 A1 | 2/2005 | Stephens | |
| 2005/0030929 A1 | 2/2005 | Swier et al. | |
| 2005/0037818 A1 | 2/2005 | Seshadri et al. | |
| 2005/0040968 A1 | 2/2005 | Damarla et al. | |
| 2005/0054326 A1 | 3/2005 | Rogers | |
| 2005/0054350 A1 | 3/2005 | Zegelin | |
| 2005/0058132 A1 | 3/2005 | Okano et al. | |
| 2005/0059405 A1 | 3/2005 | Thomson et al. | |
| 2005/0059406 A1 | 3/2005 | Thomson et al. | |
| 2005/0064873 A1 | 3/2005 | Karaoguz et al. | |
| 2005/0068925 A1 | 3/2005 | Palm et al. | |
| 2005/0073980 A1 | 4/2005 | Thomson et al. | |
| 2005/0078644 A1 | 4/2005 | Tsai et al. | |
| 2005/0097618 A1 | 5/2005 | Arling et al. | |
| 2005/0114649 A1 | 5/2005 | Challener et al. | |
| 2005/0120125 A1 | 6/2005 | Morten et al. | |
| 2005/0122927 A1 | 6/2005 | Wentink | |
| 2005/0122977 A1 | 6/2005 | Lieberman | |
| 2005/0128142 A1 | 6/2005 | Shin et al. | |
| 2005/0128989 A1 | 6/2005 | Bhagwat et al. | |
| 2005/0144237 A1 | 6/2005 | Heredia et al. | |
| 2005/0147032 A1* | 7/2005 | Lyon et al. | 370/229 |
| 2005/0154933 A1 | 7/2005 | Hsu et al. | |
| 2005/0157730 A1 | 7/2005 | Grant et al. | |
| 2005/0159154 A1 | 7/2005 | Goren | |
| 2005/0163078 A1 | 7/2005 | Oba et al. | |
| 2005/0163146 A1 | 7/2005 | Ota et al. | |
| 2005/0175027 A1 | 8/2005 | Miller et al. | |
| 2005/0180345 A1 | 8/2005 | Meier | |
| 2005/0180358 A1 | 8/2005 | Kolar et al. | |
| 2005/0181805 A1 | 8/2005 | Gallagher | |
| 2005/0190714 A1 | 9/2005 | Gorbatov et al. | |
| 2005/0193103 A1 | 9/2005 | Drabik | |
| 2005/0207336 A1 | 9/2005 | Choi et al. | |
| 2005/0213519 A1 | 9/2005 | Relan et al. | |
| 2005/0220033 A1 | 10/2005 | DelRegno et al. | |
| 2005/0223111 A1 | 10/2005 | Bhandaru et al. | |
| 2005/0239461 A1 | 10/2005 | Verma et al. | |
| 2005/0240665 A1 | 10/2005 | Gu et al. | |
| 2005/0243737 A1 | 11/2005 | Dooley et al. | |
| 2005/0245258 A1 | 11/2005 | Classon et al. | |
| 2005/0245269 A1 | 11/2005 | Demirhan et al. | |
| 2005/0259597 A1 | 11/2005 | Benedetto et al. | |
| 2005/0259611 A1 | 11/2005 | Bhagwat et al. | |

(56) References Cited

U.S. PATENT DOCUMENTS

| | | |
|---|---|---|
| 2005/0268335 A1* | 12/2005 | Le et al. .................. 726/13 |
| 2005/0270992 A1* | 12/2005 | Sanzgiri et al. ........... 370/310.2 |
| 2005/0273442 A1 | 12/2005 | Bennett et al. |
| 2005/0276218 A1 | 12/2005 | Ooghe et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0073847 A1 | 4/2006 | Pirzada et al. |
| 2006/0094440 A1 | 5/2006 | Meier et al. |
| 2006/0098607 A1 | 5/2006 | Zeng et al. |
| 2006/0104224 A1 | 5/2006 | Singh et al. |
| 2006/0114872 A1 | 6/2006 | Hamada |
| 2006/0114938 A1* | 6/2006 | Kalkunte et al. ............ 370/469 |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0143702 A1* | 6/2006 | Hisada et al. .............. 726/15 |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0173844 A1 | 8/2006 | Zhang et al. |
| 2006/0174336 A1 | 8/2006 | Chen |
| 2006/0178168 A1 | 8/2006 | Roach |
| 2006/0182118 A1 | 8/2006 | Lam et al. |
| 2006/0189311 A1 | 8/2006 | Cromer et al. |
| 2006/0190721 A1 | 8/2006 | Kawakami et al. |
| 2006/0193258 A1 | 8/2006 | Ballai |
| 2006/0200862 A1 | 9/2006 | Olson et al. |
| 2006/0206582 A1 | 9/2006 | Finn |
| 2006/0215601 A1 | 9/2006 | Vieugels et al. |
| 2006/0217131 A1 | 9/2006 | Alizadeh-Shabdiz et al. |
| 2006/0245393 A1 | 11/2006 | Bajic |
| 2006/0248229 A1 | 11/2006 | Saunderson et al. |
| 2006/0248331 A1 | 11/2006 | Harkins |
| 2006/0268696 A1 | 11/2006 | Konstantinov et al. |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0292992 A1 | 12/2006 | Tajima et al. |
| 2007/0002833 A1 | 1/2007 | Bajic |
| 2007/0008884 A1 | 1/2007 | Tang |
| 2007/0010248 A1 | 1/2007 | Dravida et al. |
| 2007/0011318 A1 | 1/2007 | Roth |
| 2007/0025265 A1 | 2/2007 | Porras et al. |
| 2007/0025306 A1 | 2/2007 | Cox et al. |
| 2007/0027964 A1 | 2/2007 | Herrod et al. |
| 2007/0054616 A1 | 3/2007 | Culbert |
| 2007/0058598 A1 | 3/2007 | Ling |
| 2007/0064673 A1 | 3/2007 | Bhandaru et al. |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1 | 4/2007 | Iyer et al. |
| 2007/0081477 A1 | 4/2007 | Jakkahalli et al. |
| 2007/0082677 A1 | 4/2007 | Donald Hart et al. |
| 2007/0083924 A1 | 4/2007 | Lu |
| 2007/0086378 A1 | 4/2007 | Matta et al. |
| 2007/0086397 A1 | 4/2007 | Taylor |
| 2007/0086398 A1 | 4/2007 | Tiwari |
| 2007/0091845 A1 | 4/2007 | Brideglall |
| 2007/0091889 A1 | 4/2007 | Xiao et al. |
| 2007/0098086 A1 | 5/2007 | Bhaskaran |
| 2007/0104197 A1 | 5/2007 | King |
| 2007/0106776 A1* | 5/2007 | Konno et al. .................. 709/223 |
| 2007/0115842 A1 | 5/2007 | Matsuda et al. |
| 2007/0133494 A1 | 6/2007 | Lai et al. |
| 2007/0135159 A1 | 6/2007 | Sinivaara |
| 2007/0135866 A1 | 6/2007 | Baker et al. |
| 2007/0136372 A1 | 6/2007 | Proctor et al. |
| 2007/0143851 A1* | 6/2007 | Nicodemus et al. ............ 726/25 |
| 2007/0150945 A1* | 6/2007 | Whitaker et al. ............... 726/13 |
| 2007/0160046 A1 | 7/2007 | Matta |
| 2007/0171909 A1 | 7/2007 | Pignatelli |
| 2007/0183375 A1 | 8/2007 | Tiwari |
| 2007/0189222 A1 | 8/2007 | Kolar et al. |
| 2007/0195793 A1* | 8/2007 | Grosser et al. ........... 370/395.53 |
| 2007/0230457 A1 | 10/2007 | Kodera et al. |
| 2007/0248009 A1 | 10/2007 | Petersen |
| 2007/0253380 A1 | 11/2007 | Jollota et al. |
| 2007/0255116 A1 | 11/2007 | Mehta et al. |
| 2007/0258448 A1 | 11/2007 | Hu |
| 2007/0260720 A1 | 11/2007 | Morain |
| 2007/0268506 A1 | 11/2007 | Zeldin |
| 2007/0268514 A1 | 11/2007 | Zeldin et al. |
| 2007/0268515 A1 | 11/2007 | Freund et al. |
| 2007/0268516 A1 | 11/2007 | Bugwadia et al. |
| 2007/0286208 A1 | 12/2007 | Kanada et al. |
| 2007/0287390 A1 | 12/2007 | Murphy et al. |
| 2007/0291689 A1 | 12/2007 | Kapur et al. |
| 2007/0297329 A1 | 12/2007 | Park et al. |
| 2008/0002588 A1 | 1/2008 | McCaughan et al. |
| 2008/0008117 A1 | 1/2008 | Alizadeh-Shabdiz |
| 2008/0013481 A1 | 1/2008 | Simons et al. |
| 2008/0014916 A1 | 1/2008 | Chen |
| 2008/0031257 A1 | 2/2008 | He |
| 2008/0056200 A1 | 3/2008 | Johnson |
| 2008/0056211 A1 | 3/2008 | Kim et al. |
| 2008/0064356 A1 | 3/2008 | Khayrallah |
| 2008/0069018 A1 | 3/2008 | Gast |
| 2008/0080441 A1 | 4/2008 | Park et al. |
| 2008/0102815 A1 | 5/2008 | Sengupta et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0130523 A1 | 6/2008 | Fridman et al. |
| 2008/0151844 A1 | 6/2008 | Tiwari |
| 2008/0159319 A1 | 7/2008 | Gast et al. |
| 2008/0162921 A1 | 7/2008 | Chesnutt et al. |
| 2008/0220772 A1 | 9/2008 | Islam et al. |
| 2008/0226075 A1 | 9/2008 | Gast |
| 2008/0228942 A1 | 9/2008 | Lor et al. |
| 2008/0250496 A1* | 10/2008 | Namihira ........................ 726/22 |
| 2008/0261615 A1 | 10/2008 | Kalhan |
| 2008/0276303 A1 | 11/2008 | Gast |
| 2009/0031044 A1 | 1/2009 | Barrack et al. |
| 2009/0046688 A1 | 2/2009 | Volpi et al. |
| 2009/0059930 A1 | 3/2009 | Ryan et al. |
| 2009/0067436 A1 | 3/2009 | Gast |
| 2009/0073905 A1 | 3/2009 | Gast |
| 2009/0131082 A1 | 5/2009 | Gast |
| 2009/0198999 A1 | 8/2009 | Harkins |
| 2009/0247103 A1 | 10/2009 | Aragon |
| 2009/0257437 A1 | 10/2009 | Tiwari |
| 2009/0260083 A1* | 10/2009 | Szeto et al. ..................... 726/22 |
| 2009/0274060 A1 | 11/2009 | Taylor |
| 2009/0287816 A1 | 11/2009 | Matta et al. |
| 2009/0293106 A1 | 11/2009 | Peden, II et al. |
| 2010/0002610 A1 | 1/2010 | Bowser et al. |
| 2010/0024007 A1 | 1/2010 | Gast |
| 2010/0067379 A1 | 3/2010 | Zhao et al. |
| 2010/0142478 A1 | 6/2010 | Forssell et al. |
| 2010/0172276 A1 | 7/2010 | Aragon |
| 2010/0180016 A1 | 7/2010 | Bugwadia et al. |
| 2010/0195549 A1 | 8/2010 | Aragon et al. |
| 2010/0261475 A1 | 10/2010 | Kim et al. |
| 2010/0329177 A1 | 12/2010 | Murphy et al. |
| 2011/0128858 A1 | 6/2011 | Matta et al. |
| 2011/0158122 A1 | 6/2011 | Murphy et al. |
| 2013/0036453 A1* | 2/2013 | Lyndersay et al. ................ 726/3 |

FOREIGN PATENT DOCUMENTS

| | | |
|---|---|---|
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |

(56) References Cited

FOREIGN PATENT DOCUMENTS

| | | |
|---|---|---|
| JP | 2004-032525 A1 | 1/2004 |
| WO | WO 94/03986 | 2/1994 |
| WO | WO 99/11003 | 3/1999 |
| WO | WO 00/06271 A1 | 2/2000 |
| WO | WO 00/18148 | 3/2000 |
| WO | WO 02/089442 A1 | 11/2002 |
| WO | WO 03/085544 A1 | 10/2003 |
| WO | WO 2004/013986 A1 | 2/2004 |
| WO | WO 2004/095192 A2 | 11/2004 |
| WO | WO 2004/095800 A1 | 11/2004 |
| WO | WO 2006/014512 A2 | 2/2006 |

OTHER PUBLICATIONS

Acampora and Winters, "System Applications for Wireless Indoor Communications" IEEE Communications Magazine, vol. 25, No. 8, Aug. 1987, pp. 11-20.

Bing and Subramanian, "A New Multiaccess Technique for Multimedia Wireless LANs" IEEE Global Telecommunications Conference, Nov. 3-8, 1997, pp. 1318-1322.

Durgin, et al., "Measurements and Models for Radio Path Loss and Penetration Loss in and Around Homes and Trees at 5.85 GHz", IEEE Transactions on Communications, vol. 46, No. 11, Nov. 1988, pp. 1484-1496.

Freret et al., Applications of Spread-Spectrum Radio to Wireless Terminal Communications, Conf. Record, Nat'l Telecom. Conf., Nov. 30-Dec. 4, IEEE, 1980, pp. 69.7.1-69.7.4.

Fortune et al., "Wise Design of Indoor Wireless Systems: Practical Computation and Optimization", IEEE Computational Science and Engineering, p. 58-68 (1995).

Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.

Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.

Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.

Kleinrock and Scholl, "Packet Switching in Radio Channels: New Conflict-Free Multiple Access Schemes for a Small Number of Data Users", Conference record 1977 ICC vol. 2 of 3, Jun. 12-15 Chicago Illinois (1977).

LAN/MAN Standards Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).

Okamoto and Xu, IEEE, "Multimedia Communications over Wireless LANs via the SWL Protocol" Proceedings of the 13th Annual Hawaii International Conference on System Sciences, pp. 54-63 (1997).

Panjwani et al., "Interactive Computation of Coverage Regions for Wireless Communication in Multifloored Indoor Environments", IEEE Journal on Selected Areas in Communications, vol. 14, No. 3, Apr. 1996.

Perram and Martinez, "Technology Developments for Low-Cost Residential Alarm Systems", Proceedings 1977 Carnahan Conference on Crime Countermeasures, Apr. 6-8, pp. 45-50 (1977).

Piazzi et al., "Achievable Accuracy of Site-Specific Path-Loss Predictions in Residential Environments", IEEE Transactions on Vehicular Technology, vol. 48, No. 3, May 1999.

Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

Puttini, R., Percher, J., Me, L., and de Sousa, R. 2004. A fully distributed IDS for MANET. In *Proceedings of the Ninth international Symposium on Computers and Communications 2004* vol. 2 *(ISCC"04)*—vol. 02 (Jun. 28-Jul. 1, 2004). ISCC. IEEE Computer Society, Washington, DC, 331-338.

P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.

Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).

P. Bahl et al., Radar: An In-Building RF-based User Location and Tracking System, Microsoft Research, Mar. 2000, 10 pages.

Latvala J. et al., Evaluation of RSSI-Based Human Tracking, Proceedings for the 2000 European Signal Processing Conference, Sep. 2000, 9 pages.

Bahl P. et al. "User Location and Tracking in an In-Building Radio Network," Microsoft Research, Feb. 1999, 13 pages.

P. Bahl et al., A Software System for Locating Mobile Users: Design, Evaluation, and Lessons, Microsoft Research, Feb. 1999, 13 pages.

Chen, Yen-Chen et al., "Enabling Location-Based Services on Wireless LANs", Networks, 2003. ICON2003. The 11th IEEE International Conference, Sep. 28-Oct. 1, 2003, pp. 567-572.

Erten, Y. Murat, "A Layered Security Architecture for Corporate 802.11 Wireless Networks", Wireless Telecommunications Symposium, May 14-15, 2004, pp. 123-128.

Kleine-Ostmann, T., et al., "A Data Fusion Architecture for Enhanced Position Estimation in Wireless Networks," IEEE Communications Letters, vol. 5(8), Aug. 2001, p. 343-345.

Pulson, Time Domain Corporation, Ultra wideband (UWB) Radios for Precision Location, Third IEEE Workshop on Wireless Local Area Networks, Sep. 27-28, 2001, 8 pages.

Barber, S., Monitoring 802.1 Networks, IEEE 802.11, Sydney, NSW, May 13-17, 2002.

Latvala, J. et al. "Patient Tracking in a Hospital Environment Using Extended Kalman-filtering," Proceedings of the 1999 Middle East Conference on Networking, Nov. 1999, 5 pages.

Myllymaki, P. et al., "A Probabilistic Approach to WLAN User Location Estimation," Third IEEE Workshop on Wireless Local Area Networks, Sep. 27-28, 2001, 12 pages.

Potter, B., and Fleck, B., 802.11 Security, O'Reilly Media Inc., Dec. 2002, 14 pages.

McCann, S., et al., "Emergency Services for 802," IEEE 802.11-07/0505rl, Mar. 2007, 27 pages.

Di Sorte, D., et al., "On the Performance of Service Publishing in IEEE 802.11 Multi-Access Environment," IEEE Communications Letters, vol. 11, No. 4, Apr. 2007, 3 pages.

Microsoft Computer Dictionary, Fifth Edition, Microsoft Corporation, 2002, 2 pages.

Thomson, Allan, Cisco Systems, AP Power Down Notification, Power Point slide show; IEEE standards committee meeting Jul. 15, 2008; doc.: IEEE 802.11-08/0759r0, 14 pages.

3COM, Wireless LAN Mobility System: Wireless Lan Switch and Controller Configuration Guide, 3COM, Revision A, Oct. 2004, 476 pages.

3COM, Wireless LAN Switch Manager (3WXM), 3COM, Revision C, Oct. 2004, 8 pages.

3COM, Wireless LAN Switch and Controller; Quick Start Guide, 3COM, Revision B, Nov. 2004, 10 pages.

3COM, Wireless LAN Mobility System, Wireless LAN Switch and Controller Installation and Basic Configuration Guide, Revision B, Apr. 2005, 496 pages.

Johnson, David B, et al., "DSR the Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).

Information Sciences Institute, RFC-791—Internet Protocol, DARPA, Sep. 1981.

(56) References Cited

OTHER PUBLICATIONS

U.S. Appl. No. 12/603,391, filed Oct. 21, 2009.
U.S. Appl. No. 12/763,057, filed Apr. 19, 2010.
U.S. Appl. No. 13/006,950, filed Jan. 14, 2011.
U.S. Appl. No. 09/866,474, filed May 29, 2001.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S Appl. No. 11/487,722, mailed Aug. 7, 2009.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Office Action for U.S. Appl. No. 12/113,535, mailed Apr. 21, 2011.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/350,927, mailed Aug. 17, 2011.
Office Action for U.S. Appl. No. 12/365,891, mailed Aug. 29, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.

(56) References Cited

OTHER PUBLICATIONS

International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
U.S. Appl. No. 12/957,997, filed Dec. 1, 2010.
U.S. Appl. No. 13/447,656, filed Apr. 16, 2012.
U.S. Appl. No. 13/396,124, filed Feb. 14, 2012.
U.S. Appl. No. 13/437,669, filed Apr. 2, 2012.
U.S. Appl. No. 13/437,673, filed Apr. 2, 2012.
Office Action for U.S. Appl. No. 12/401,073, mailed Sep. 20, 2011.
Final Office Action for U.S. Appl. No. 12/489,295, mailed Jan. 18, 2012.
Office Action for U.S. Appl. No. 11/351,104, mailed Feb. 15, 2012.
Office Action for U.S. Appl. No. 11/417,993, mailed Oct. 29, 2008.
Office Action for U.S. Appl. No. 11/845,029, mailed Sep. 27, 2011.
Office Action for U.S. Appl. No. 12/683,281, mailed Jan. 20, 2012.
Final Office Action for U.S. Appl. No. 12/304,100, mailed Feb. 2, 2012.
Final Office Action for U.S. Appl. No. 12/077,051, mailed Oct. 25, 2011.
Final Office Action for U.S. Appl. No. 12/113,535, mailed Jan. 3, 2012.
Office Action for U.S. Appl. No. 12/113,535, mailed Apr. 20, 2012.
Final Office Action for U.S. Appl. No. 11/852,234, mailed Jan. 20, 2012.
Office Action for U.S. Appl. No. 12/210,917, mailed Dec. 5, 2011.
Final Office Action for U.S. Appl. No. 12/350,927, mailed Jan. 18, 2012.
Second Office Action for Chinese Application No. 2007800229623.X, mailed Mar. 7, 2012—translation Yes.
Extended Supplementary European Search Report for Application No. 07796005.2, mailed Feb. 14, 2012.
Office Action for Canadian Application No. 2,638,754, mailed Oct. 3, 2011.

* cited by examiner

SYSTEM AND METHOD FOR RESTRICTING NETWORK ACCESS USING FORWARDING DATABASES

CROSS-REFERENCE TO RELATED APPLICATIONS

This application is a Continuation of U.S. application Ser. No. 11/417,993 filed May 3, 2006, (now U.S. Pat. No. 7,558,266), which is incorporated herein in its entirety by reference.

BACKGROUND

A computer network such as a local area network (LAN), a wide area network (WAN), or the Internet facilitates communication among devices (e.g., clients). These devices may include workstations, servers, personal computers, cell phones, PDAs, wireless access points, laptops, and other electronic devices.

Before a client can communicate over or with a network, the client must obtain an Internet Protocol (IP) address. A client may acquire an IP address through, for example, a client-server networking protocol such as, by way of example but not limitation, Bootstrap Protocol (BOOTP) which is a User Datagram Protocol (UDP), Dynamic Host Configuration Protocol (DHCP), that can be used to assign dynamic IP addresses to clients, Point-to-Point Protocol over Ethernet (PPPoE), or some other known or convenient networking protocol.

A network may filter communication to and from a client that has not yet been assigned an IP address. For example, a network may be configured so that one or more Access Control Lists (ACLs) indicate whether to forward or discard a packet or a class of packets. The ACL may be used, by way of example but not limitation, to direct network routers to drop all packets originating from and directed to a client that has not been assigned an IP address.

Filtering mechanisms of the variety described above, however, may consume significant network resources while processing data to and from clients without IP addresses because the packets are not discarded until the routing phase. Moreover, networks using schemes such as ACL configuration to filter packets may unnecessarily complicate decision-making for users and raise additional security issues.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for restricting network access involves determining whether a data unit, such as a packet or a frame, has a layer 3 address assignment, such as an IP address assignment. A method according to the technique may include receiving a data unit including layer 2 client-identification data and determining whether the data unit includes layer 3 address data. If the data unit does not include any layer 3 address data, in this example, the method may proceed in determining whether the layer 2 client-identification data has been recorded. If the layer 2 client-identification data has not been recorded, in this example, the method may proceed in recording the layer 2 client-identification data and enabling a layer 3 address assignment status restriction attribute. If, on the other hand, the layer 2 client-identification data has been recorded, unless the address assignment status restriction attribute is enabled, in this example, the method may proceed with forwarding the data unit.

A system according to the technique may include an address restriction engine, coupled to a memory and a switching device, for executing packet forwarding and data traffic filtering functions. The address restriction engine may include an address status restriction module having control logic for manipulating said layer 3 address assignment status restriction attribute and a packet forwarding module having logic for monitoring data traffic and for notifying the address status restriction module that it has received data with layer 3 address assignment data. The address status restriction module may determine whether to disable the layer 3 address assignment status restriction attribute based on data it receives from the packet forwarding module.

The proposed system can offer, among other advantages, to, for example, dynamically allow or reject non-DHCP packets entering a switch. In addition, a FDB is commonly used by a bridge or switch to store an incoming packet's source MAC address and its port number, then later on if the destination MAC address of another incoming packet matching any entry in FDB will be forwarded to its associated port. Using the techniques described herein, not only this will be completely transparent to user, it can also increase switch performance by blocking unwanted traffic at an earlier stage of the packet forwarding process and freeing up other processing units at a later stage, like switch fabric or packet processing stages.

BRIEF DESCRIPTION OF THE DRAWINGS

Embodiments of the present invention are illustrated in the figures. However, the embodiments and figures are illustrative rather than limiting; they provide examples of the invention.

The foregoing examples of the related art and limitations related therewith are intended to be illustrative and not exclusive. Other limitations of the related art will become apparent to those of skill in the art upon a reading of the specification and a study of the drawings.

DETAILED DESCRIPTION

In the following description, for the purposes of explanation, numerous specific details are set forth in order to provide a thorough understanding of the present invention. It will be apparent, however, to one skilled in the art that the present invention may be practiced without one or more of these specific details or in combination with other components or process steps. In other instances, well-known structures and devices are shown in block diagram form in order to avoid unnecessarily obscuring the present invention.

Figure 1:
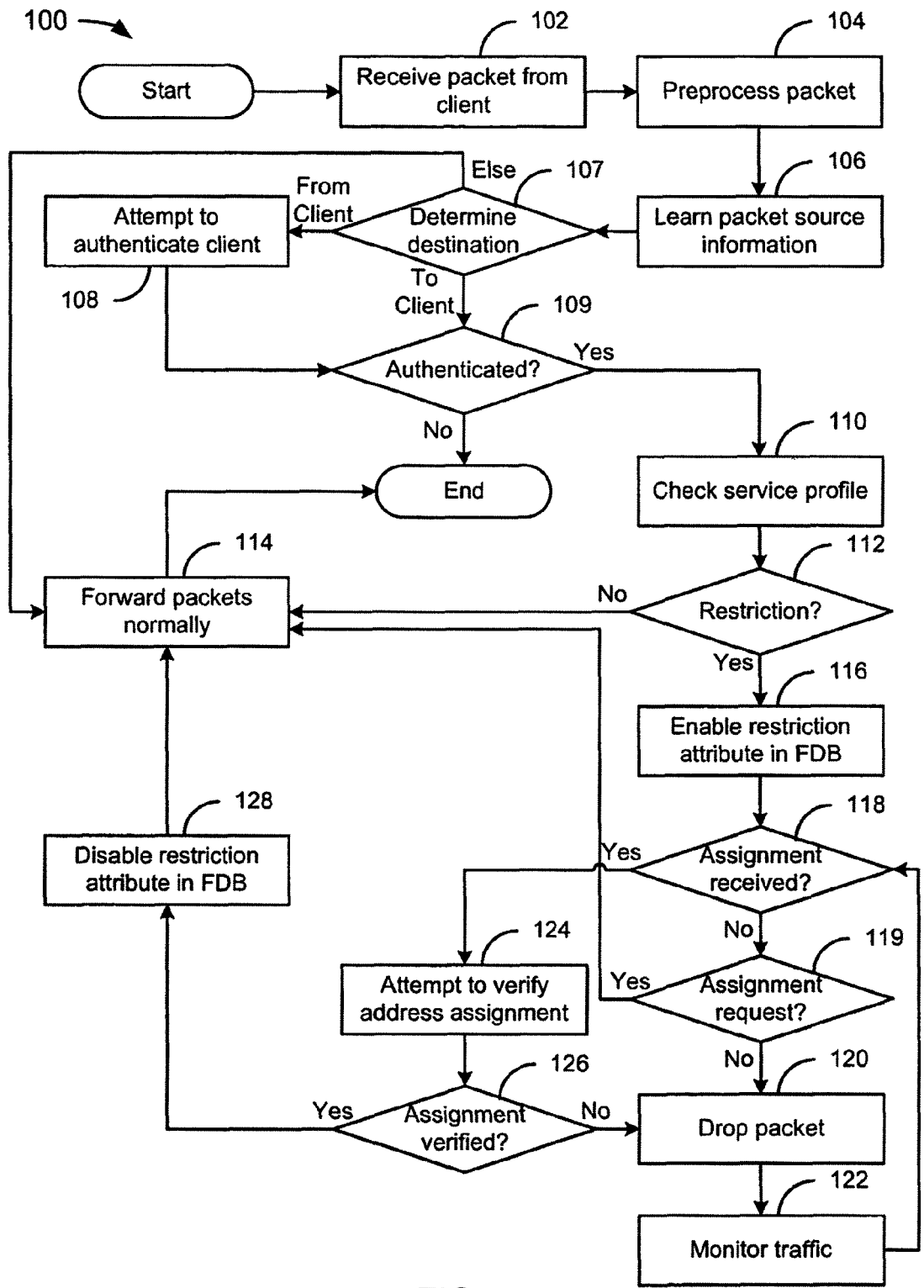
FIG. 1 depicts a flowchart of an example of a method for managing an address assignment status restriction attribute in a forwarding database (FDB).

FIG. 1 depicts a flowchart 100 of an example of a method for managing an address assignment status restriction attribute in a forwarding database (FDB). This method and other methods are depicted as serially arranged modules. However, modules of the methods may be reordered, or arranged for parallel execution as appropriate.

In the example of FIG. 1, the flowchart 100 starts at module 102 where a data packet is received from a client. The client may include, by way of example but not limitation, a cell phone, PDA, personal computer, laptop, notebook computer, workstation, or some other known or convenient wired or wireless device. The client may send to a network a data packet with information including, by way of example but not limitation, source address, destination address, and message data.

The network may include a wired network, a wireless network, a LAN, a WAN, or a network such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well-known to those of skill in the art.

In the Open Systems Interconnection (OSI) communications model, a switch performs a layer 2 or Data-Link layer function. That is, the switch looks at each packet or data unit and determines from a physical address (the "MAC address") which device a data unit is intended for and switches it out toward that device. However, in wide area networks such as the Internet, the destination address requires a look-up in a routing table by a device known as a router. Some switches also perform routing functions (layer 3 or the Network layer functions in OSI and layer 4 or the Transport layer functions) and are sometimes called IP switches. As used herein, a switching device may be any layer 2, layer 3, or layer 4 device.

The time a switch takes to determine where to forward a data unit is called its latency. The price paid for having the flexibility that switches provide in a network is this latency. Switches are found at the backbone and gateway levels of a network where one network connects with another and at the sub-network level where data is being forwarded close to its destination or origin. The former are often known as core switches and the latter as desktop switches.

In packet-switching, a message is divided into packets, which are units of a certain number of bytes. The network addresses of the sender and of the destination are added to the packet. Each network point looks at the packet to see where to send it next. Packets in the same message may travel different routes and may not arrive in the same order that they were sent. At the destination, the packets in a message are collected and reassembled into the original message.

Referring once again to the example of FIG. 1, the flowchart 100 continues to module 104 where the packet is preprocessed for classification according to, for example, the source of the packet. A packet may originate from one of numerous sources including but not limited to an access point, a network port, or a central processing unit (CPU). Moreover, depending on criteria such as the source of the packet and the configuration of the network, the preprocessing functions may be executed by devices such as, by way of example but not limitation, a network processor, a general processor, or pre-processing software tailored for the task.

In the example of FIG. 1, the flowchart 100 continues to module 106 where additional packet source information is learned. In an embodiment, a network switch receives the packet and learns information associated with the packet. The network switch may include, for example, a switching fabric coupled to a forwarding database (FDB) having a forwarding memory. In an embodiment, the forwarding memory stores a number of entries comprising information including but not limited to address data, port identification (ID), and entry age. The entry age can be used to, for example, facilitate the removal of old entries so that the database is not cluttered with outdated entries. The FDB may store entries according to the client's media access control (MAC) addresses, network addresses, both the MAC and network addresses, or in some other known or convenient manner.

In an embodiment, a network switch performs a look-up in the FDB upon receipt of a packet. If an entry associated with the client's identification information is found in the FDB, no action is required. On the other hand, if the FDB does not include an entry associated with the client's identification information, a new entry is added to the FDB comprising information including but not limited to the client's MAC address, port ID, and a number of other attributes associated with the client. In an embodiment, a processing unit associated with the switch updates the FDB with a new entry. In an alternative embodiment, a CPU coupled to a number of network switches is responsible for learning data traffic passing through these switches and updating a central FDB. Additionally, the processor may be implemented with a number of devices including but not limited to, a specialized network processor or a general processor.

In the example of FIG. 1, the flowchart 100 continues to decision point 107 where a destination of the packet is determined from the information available in the packet. If the destination is from the client, then the flowchart 100 continues to module 108 where an attempt is made to authenticate the client. For example, a CPU associated with the network switch may attempt to authenticate the client using a known or convenient authentication scheme. The CPU may authenticate the client using a cryptographic protocol such as, by way of example but not limitation, the Otway-Rees or the Wide-Mouth Frog protocol. Moreover, the CPU may be configured in a number of ways. In one embodiment, the CPU may be a local processor associated with one network switch and responsible for authenticating data traffic that pass through the network switch. In an alternative embodiment, the CPU may be coupled to a number of network switches and responsible for authenticating data traffic passing through these switches. Additionally, the CPU may be implemented with a number of devices including but not limited to, a specialized network processor or a general processor.

Returning once again to the decision point 107, if the destination of the packet is to the client, or after an attempt to authenticate the client is made at module 108 (if the destination is from the client), then the flowchart continues to decision point 109. It may be noted that if the destination is not determined to be to or from the client (else), the flowchart 100 continues to module 114, which is described later.

In the example of FIG. 1, the flowchart 100 continues from module 108 to decision point 109, where it is determined whether the client is authenticated. If the client is not authenticated (109-NO), the packet is dropped and the client cannot communicate over or with the network. If the client is authenticated (109-YES), the flowchart 100 continues at module 110 where the CPU identifies the client according to information contained in the packet and extracts a service profile associated with the client. The service profile may include information specific to the client, such as a set of minimum requirements. The set of minimum requirements may include, by way of example but not limitation, level of security or Quality of Service (QoS). In an embodiment, the service profile also includes information indicating whether communication with the client is restricted according to IP address assignment status. In an alternative embodiment, the service profile may not include such information, or the information may not be acted upon (e.g., at modules 112, 114). The packet information may include, by way of example but not limitation, the destination address and port ID.

In the example of FIG. 1, the flowchart 100 continues to decision point 112 where it is determined whether IP address assignment restriction is required. In an embodiment, the CPU may make this determination based on the service profile. If the service profile specifies that communication with the client need not be filtered according to IP address assignment status (112-NO), the flowchart 100 continues to module 114 where the network switch proceeds to forward the packet according to packet information (and, for illustrative purposes, the flowchart 100 ends although it should be noted that the packets may continue to be forwarded practically indefinitely). If the service profile indicates that communication with the client is restricted according to IP address assignment status (112-YES), the flowchart 100 continues to module 116 where the packet is dropped and an IP address assignment restriction status attribute associated with the client is enable. In an embodiment, the CPU may enable the IP address assignment restriction status attribute in the FDB.

In the example of FIG. 1, the flowchart 100 continues to decision point 118 where it is determined whether an assignment has been received. A packet that includes an assignment is of particular note because packets cannot be forwarded until, for example, an IP assignment has been made. If it is determined that an assignment has not been received (118-NO), the flowchart 100 continues to decision point 119 where it is determined whether there is an assignment request. If it is determined that there is an assignment request (119-Yes), then the flowchart 100 continues to module 114, which was described previously. If, on the other hand, it is determined that there is no assignment request (119-No), then the flowchart 100 continues to module 120 where the packet is dropped, to module 122 where traffic continues to be monitored (e.g., filtered according to the IP address assignment status associated with data the network switch receives), and back to decision point 118. Advantageously, only packets with, for example, a DHCP protocol are allowed to enter the network switch. This may improve the performance of the switch. If, on the other hand, it is determined that an assignment has been received (118-YES), the flowchart 100 continues to module 124 where verification of the address assignment is attempted. The verification may be by any known or convenient means.

In the example of FIG. 1, the flowchart 100 continues to decision point 126 where it is determined whether the assignment is verified. If it is determined that the assignment is not verified (126-NO), the flowchart 100 continues to module 120 where the packet is dropped, and continues from module 120 as described previously. If, on the other hand, it is determined that the assignment is verified (126-YES), the flowchart 100 continues to module 128 where the IP address assignment restriction status attribute is disabled. The flowchart 100 ends at module 114 where packets are forwarded normally, as previously described. Advantageously, since the IP address assignment restriction status attribute is disabled until after IP address assignment, which prevents the forwarding of potentially many packets to the network switch, the network switch can operate more efficiently.

Figure 2:
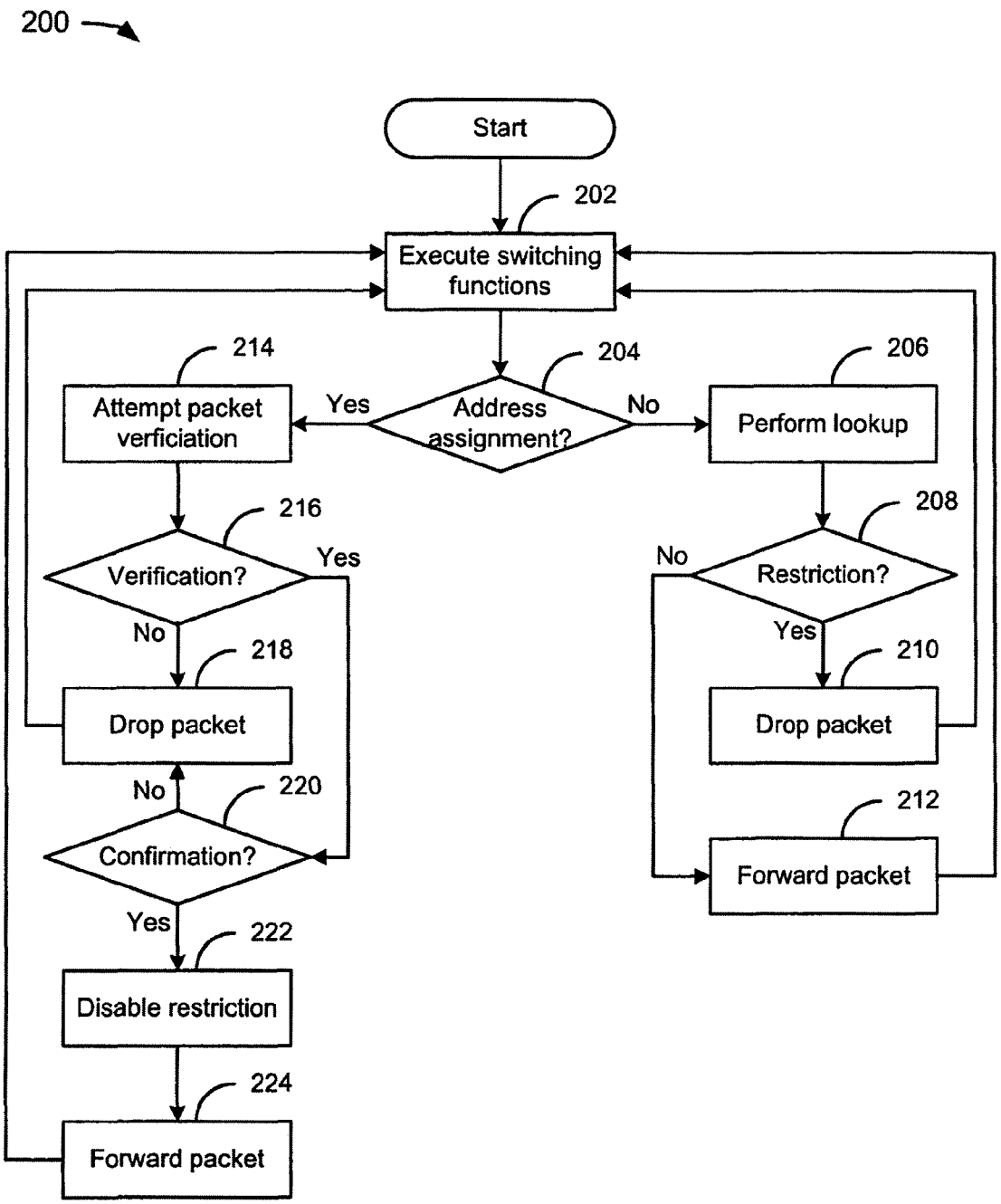
FIG. 2 depicts a flowchart of an example of a method for data filtering.

FIG. 2 depicts a flowchart 200 of an example of a method for data filtering. Data filtering may be used in conjunction with, for example, the method of FIG. 1. In the example of FIG. 2, the flowchart 200 begins at module 202 where switching functions are executed. For example, a forwarding processor associated with a network switch may execute switching functions including, by way of example and not limitation, looking up a FDB, checking FDB entry fields including an IP address assignment status restriction attribute, and forwarding packets to a specified destination. In an embodiment, a CPU or other processor may function as the forwarding processor. In another embodiment, the forwarding processor is an independent processor configured to manage switching tasks. In this alternative embodiment, the CPU does not process data to or from the client while the client has yet to obtain an IP address. The forwarding processor may be implemented, by way of example but not limitation, in a general processor, in the CPU as a sub-processor, or in a specialized network processor.

In the example in FIG. 2, the flowchart 200 continues to decision point 204 where it is determined whether a packet includes address assignment information. For example, each time a forwarding processor receives a packet, the forwarding processor may make a determination as to whether the packet includes IP address assignment information. If the packet does not include IP address assignment information (204-NO), the flowchart continues to module 206 where a look-up is performed, and the client's IP address is allowed to be forwarded. For example, the forwarding processor may perform a look-up function in the FDB associated with the network switch. The packet information the forwarding processor uses for the look-up function may include, by way of example and not limitation, the MAC address or the network address of the packet sender.

In the example of FIG. 2, the flowchart 200 continues to the decision point 208 where it is determined whether the IP address assignment status restriction attribute is enabled. If the attribute is enabled (208-YES), the flowchart 200 proceeds to module 210 where the packet is dropped, from packets originating from or destined for the client, and the flowchart 200 returns to module 202. If the attribute is disabled (208-NO), the flowchart 200 continues to module 212 where the packet is forwarded and the flowchart 200 returns to module 202. For example, the forwarding processor may allow the network switch to forward the packet according to packet information. The packet information may include, by way of example but not limitation, the destination address and port ID.

Returning now to the flowchart 200 at decision point 204. If it is determined that the packet includes address assignment information, then the flowchart 200 continues to module 214 where packet verification is attempted. For example, the forwarding processor may determine that the packet includes IP address assignment information, and send the packet to the CPU for verification.

In the example of FIG. 2, the flowchart 200 continues to decision point 216 where it is determined whether the IP address assignment information can be verified. For example, the CPU may attempt to verify that the packet includes IP address assignment information. If the CPU cannot verify the IP address assignment information (216-NO), the flowchart 200 continues to module 218 where the packet is dropped. If the CPU verifies that the data packet includes IP address assignment information (216-YES), the flowchart 200 continues to decision point 220 where it is determined whether confirmation that an IP address has been assigned has been received. For example, the CPU may determine whether the packet includes confirmation that an IP address has been assigned. The methods for determining whether an IP address assignment has been confirmed may vary and include, by way of example and not limitation, receipt of a packet containing an IP address assignment for the destination device, receipt of a packet acknowledging the receipt of an IP address assignment, or the receipt of both an address assignment and an acknowledgment.

In the example of FIG. 2, if, for example, the CPU determines that the IP address assignment information in the packet does not confirm an address assignment (220-NO), the flowchart 200 loops back to module 218 where the packet is dropped, as described previously. It may be noted that there could be some type of delay or waiting period before dropping the packet depending upon the implementation. It may also be noted that switching functions for other packets may be executing concurrently during the delay. If the CPU determines that the IP address assignment information in the packet confirms an address assignment (220-YES), the flowchart 200 proceeds to module 222 where the IP assignment status restriction is disabled. For example, the CPU may disable the IP assignment status restriction attribute in the FDB entry associated with the device whose address assignment has been confirmed. The flowchart 200 continues to module 224 where the packet is forwarded. For example, the network switch may forward the packet according to packet information. The packet information may include, by way of example but not limitation, the destination address and port ID.

FIGS. 1 and 2 serve to illustrate methods by way of example. Fewer or more modules may be used to promote additional features and alternative embodiments. For example, in one implementation, the CPU may apply address status restrictions on all clients without e.g., checking service profiles. In another implementation, the CPU does not verify a packet identified as having IP address assignment information and proceeds directly to module 118 from module 126. Moreover, terms and examples described serve illustrative purposes only and are not intended to be limiting. For example, although the term "packet" or "data packet" is used to describe a unit of information in the processing and switching operations above, one skilled in the art would appreciate that information may be transmitted in other data unit forms including, by way of example and not limitation, a data packet or a frame. Some instances above describe information filtering for data originating from a source that has not yet obtained an IP address assignment, one skilled in the art would readily perceive that data can be filtered either to or from such a source.

Figures 3, 4:
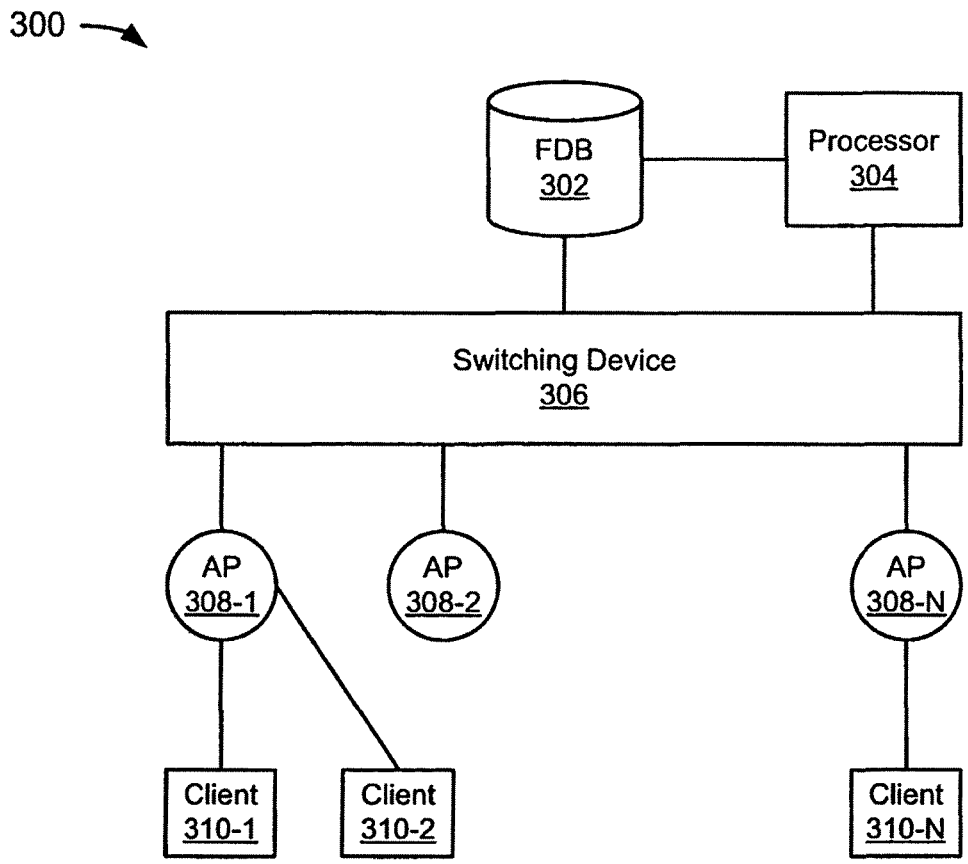
FIG. 3 is a block diagram illustrating an example of a network system including a forwarding database (FDB) for filtering network traffic based on IP address assignment status.
FIG. 4 is a schematic illustration of an example of a forwarding database entry.

FIG. 3 is a block diagram illustrating an example of a network system 300 including a forwarding database for filtering network traffic based on IP address assignment status. In the example of FIG. 3, the network system 300 includes a FDB 302, a processor 304, a switching device 306, wireless access points (APs) 308-1 to 308-N (referred to hereinafter collectively as APs 308), and clients 310-1 to 310-N (referred to hereinafter collectively as clients 310). It may be noted that in alternative embodiments, two or more of the FDB 302, processor 304, switching device 306, and APs 308 may be located locally with respect to one another.

In the example of FIG. 3, the network system 300 includes a wireless network for illustrative purposes. However, at least some of the techniques described herein could be used in both a wireless and a wired network.

The FDB 302 may be implemented with a forwarding memory (not shown). The forwarding memory stores a table containing entries having identification information extracted from data traffic that the switching device 306 receives and may include, by way of example and not limitation, MAC address, port ID, and virtual LAN (VLAN) ID. Additionally, the entries may include numerous attributes including, by way of example and not limitation, the age of the entry, and the IP address assignment status associated with the identification information. In an alternative embodiment, the FDB 302 may be implemented with a forwarding memory (not shown) for storing entries having information extracted from data traffic and a distinct associated memory (not shown) for storing attribute data associated with each entry in the forwarding memory. The data entries stored in the FDB 302 are used to identify the destination information and forwarding attributes associated with a data packet so that the packet may be forwarded to its specified destination. Entries in the FDB 302 are described in more detail later with reference to FIG. 4. For the purpose of example only, the system 300 could be configured such that the address to be restricted is one that originates from a wireless client, such as one of the wireless clients 310.

In the example of FIG. 3, the processor 304 is coupled to the FDB 302 and the switching device 306. In an embodiment, the processor 304 may execute switching functions using the FDB 302 and the switching device 306. In an embodiment, the processor 304 may be implemented as a CPU that processes data traffic that the switching device 306 receives and accesses the FDB 302 to update the entries therein. The CPU may, by way of example and not limitation, learn an address in a data packet, read associated data corresponding to a data packet, age the entries in the FDB 302, invalidate outdated entries in the FDB 302, replace entries in the FDB 302, access search keys in the FDB 302, and update attributes in the entries of the FDB 302. In one embodiment, the CPU may be configured to monitor and filter the data traffic that the switching device 306 receives with a method such as that described in FIG. 2. In an alternative embodiment, a forwarding processor (not shown) monitors the forwarding data traffic and alerts the CPU with information necessary to update the entries in the FDB 302. In one embodiment, the forwarding processor (not shown) is implemented independently of the CPU with, by way of example and not limitation, a general processor or a network processor. In another embodiment, the forwarding processor (not shown) is implemented as a sub-processor in the CPU.

The switching device 306 may, in an embodiment, have a switching fabric (not shown) including, by way of example and not limitation, one or more switching Application Specific Integrated Circuits (ASICs). Furthermore, the switching ASICs may, for example, be configured to perform level 2 switching functions, level 3 switching functions, level 3 routing functions, level 4 switching functions, and level 4 routing functions. In an alternative embodiment, the switching fabric may implement the level 2 to 4 switching and routing functions by using software or by using hardware not dependents on ASICs. The switching device 306 may channel incoming data from input ports (not shown) to a specific output port that will take data toward an intended destination. On, for example, an Ethernet local area network (LAN), a switching device determines from the physical device (Media Access Control or MAC) address in each incoming message frame which output port to forward it to and out of. In, for example, a wide area packet-switched network such as the Internet, a switching device determines from the IP address in each packet which output port to use for the next part of its trip to the intended destination. In, for example, a circuit-switched network, one or more switching devices are used to set up a dedicated though temporary connection between two or more parties.

In the example of FIG. 3, data from the clients 310 are forwarded through the APs 308 to the switching device 306. In an embodiment where the IP addresses assignment status of clients 310 are restricted, packets sent to and from the clients 310 are discarded, at least until the restriction attribute is disabled in the FDB entries associated with the client 310, as was described previously with reference to FIG. 1 and FIG. 2.

FIG. 4 is a schematic illustration of a FDB entry 400. In the example of FIG. 4, the FDB entry 400 includes a port ID field 402, a MAC address field 404, a VLAN ID field 406, an age field 408, an address status restriction field 410, and possibly other fields. The port ID field 402 identifies the port on which an associated message was received. The MAC address field 404 identifies the physical address of the device from which the message originated. A VLAN allows devices located on different physical LAN segments to communication as though they are on the same physical LAN segments. In so doing, a VLAN promotes efficiency based on traffic pattern rather than proximity. The VLAN ID enables devices grouped in a VLAN to identify each other within the VLAN. The FDB entry shown in FIG. 4 includes both identification data (e.g. MAC address, VLAN address, port ID) and attributes (e.g. age, IP address assignment status). In another embodiment, the FDB includes a forwarding memory (not shown) for storing entries having identification data and a separate associated memory (not shown) for storing attributes associated with the entries in the forwarding memory. In yet another embodiment, filtering based on IP address assignment status is implemented in hardware.

Figure 5:
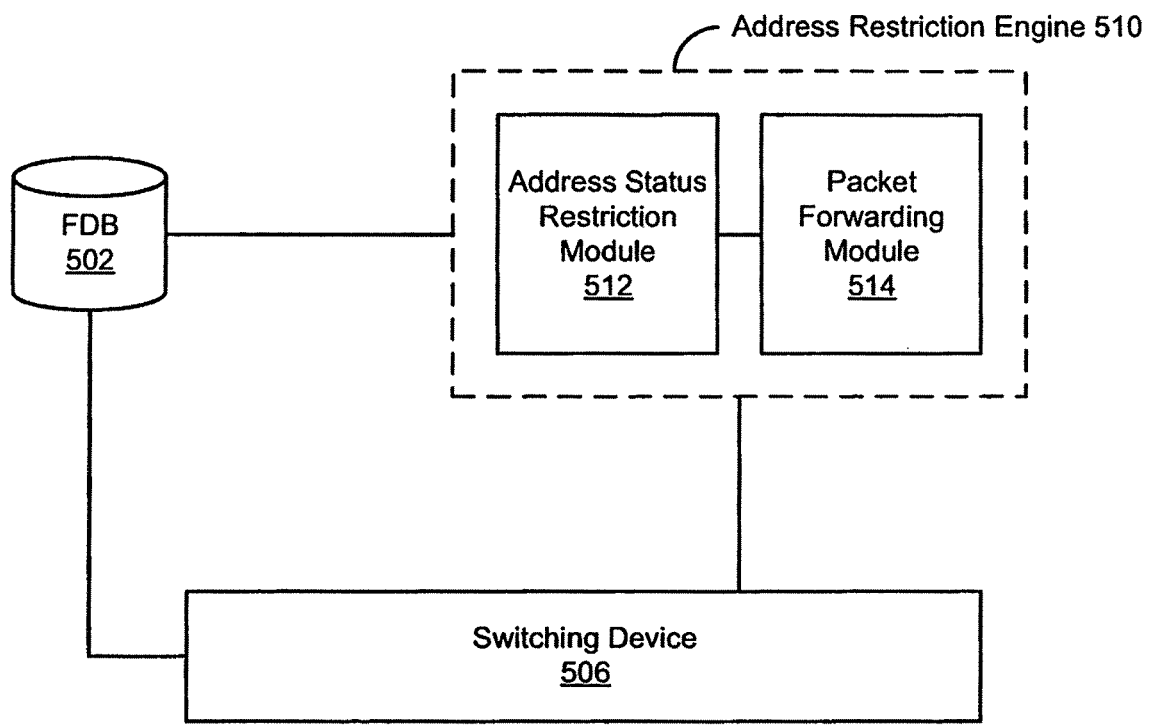
FIG. 5 is a block diagram illustrating an example of a network system including an address restriction engine for filtering data traffic.

FIG. 5 is a block diagram illustrating an example of a network system 500 including an address restriction engine for filtering data traffic. In the example of FIG. 5, the network system includes a FDB 502, an address restriction engine 510, and a switching device 512. The address restriction engine 510 further includes an address status restriction module 504 and a packet forwarding module 506.

In an embodiment, the FDB 502 may include a forwarding memory (not shown). The forwarding memory stores a table containing entries having information extracted from data traffic that the switching device 512 receives and may include, by way of example and not limitation, MAC address, port ID, and virtual LAN (VLAN) ID. Additionally, the entries may include numerous attributes including, by way of example and not limitation, the age of the entry, and the IP address assignment status associated with the identification information. In an alternative embodiment, the FDB 502 includes a forwarding memory (not shown) for storing entries having information extracted from data traffic and a distinct associated memory (not shown) for storing attribute data associated with each entry in the forwarding memory. The data entries stored in the FDB 502 are used to identify the destination information and forwarding attributes associated with a data packet so that the packet may be forwarded to its specified destination. For the purpose of example only, the system 500 could be configured such that the address to be restricted is one that originates from a wireless client, such as one of the wireless clients 310.

In the example of FIG. 5, the address restriction engine 510 is coupled to the FDB 502 and the switching device 512. In an embodiment, the engine 510 may execute switching functions using the FDB 502 and the switching device 512. In another embodiment, the engine 510 monitors the data traffic that the switching device 512 receives and filters the traffic in addition to executing switching functions. In an embodiment, the engine 510 filters the data traffic passing through the switching device 512 by delegating separate monitoring and switching functions between the address status restriction module 504 and the packet forwarding module 506. In an embodiment, the address status restriction module 504 accesses the FDB 502 to manipulate an entry attribute based on the IP address assignment status of the device associated with the entry. The packet forwarding module 506 monitors the data traffic that the switching device 512 receives for packets that may change the IP address assignment status of a device and notifies the address status restriction module 504 of potential change in address assignments. The address status restriction module 504, in turn, verifies whether an IP address has been assigned based on the information it receives from the packet forwarding module 506. The address restriction engine 510 may be implemented, by way of example and not limitation, with a CPU, a network processor, or a general processor. In one embodiment, the engine 510 is a processor that includes a first sub-processor having the restriction module 504 and a second sub-processor having the forwarding module 506. In an alternative embodiment, the engine 510 includes a first processor (e.g. CPU, general processor, network processor) having the restriction module 504 and a second processor (e.g. CPU, general processor, network processor) having the forwarding module 506.

In an embodiment, the switching device 512 may have a switching fabric (not shown) including, by way of example and not limitation, one or more switching Application Specific Integrated Circuits (ASICs). Furthermore, the switching ASICs may, for example, be configured to perform level 2 switching functions, level 3 switching functions, level 3 routing functions, level 4 switching functions, and level 4 routing functions. In an alternative embodiment, the switching fabric may implement the level 2 to 4 switching and routing functions by using software or by using hardware not dependents on ASICs. The switching device 512 may channel incoming data from input ports (not shown) to a specific output port that will take data toward an intended destination. On, for example, an Ethernet local area network (LAN), a switching device determines from the physical device (Media Access Control or MAC) address in each incoming message frame which output port to forward it to and out of. In, for example, a wide area packet-switched network such as the Internet, a switching device determines from the IP address in each packet which output port to use for the next part of its trip to the intended destination. In, for example, a circuit-switched network, one or more switching devices are used to set up a dedicated though temporary connection between two or more parties.

Figure 6:
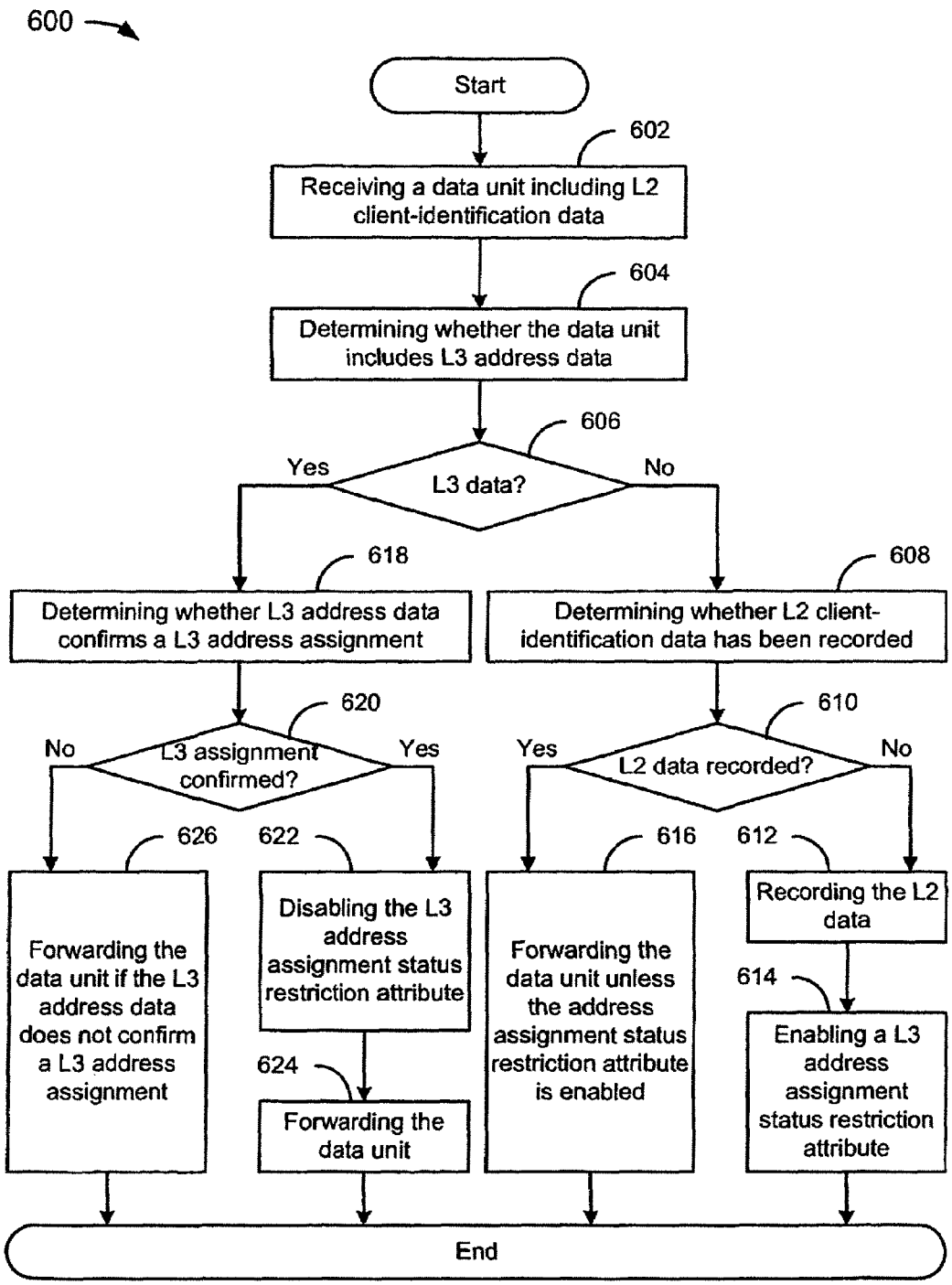
FIG. 6 depicts a flowchart 600 of an example of a method for restrictive data forwarding.

FIG. 6 depicts a flowchart 600 of an example of a method for restrictive data forwarding. In the example of FIG. 6, the flowchart 600 starts at module 602 with receiving a data unity include layer 2 client-identification data. The flowchart 600 continues to module 604 with determining whether the data unit includes layer 3 address data. If, at decision point 608, it is determined that the data unit does not include layer 3 address data, then the flowchart 600 continues to module 608 with determining whether layer 2 client-identification data has been recorded. If it is determined at decision point 610 that layer 2 data has not been recorded, then the flowchart continues to module 612 with recording the layer 2 data and to module 614 with enabling a layer 3 address assignment status restriction attribute, then the flowchart 600 ends. If, on the other hand, it is determined at decision point 610 that layer 2 data has been recorded, then the flowchart ends at module 616 with forwarding the data unity unless the address assignment status restriction attribute is enabled.

Returning once again to decision point 606 of FIG. 6, if it is determined that the data unit includes layer 3 data (606-Yes), then the flowchart 600 continues to module 618 with determining whether layer 3 address data confirms a layer 3 address assignment. If, at decision point 620, it is determined that the layer 3 address assignment is not confirmed, then the flowchart 600 continues to module 622 with disabling the layer 3 address assignment status restriction attribute, to module 624 with forwarding the data unit, and the flowchart 600 ends. If, on the other hand, it is determined that the layer 3 address assignment is confirmed, then the flowchart 600 ends at module 626 with forwarding the data unit if the layer 3 address data does not confirm a layer 3 address assignment. Where a data unit is not forwarded, it may or may not be dropped, depending upon the implementation.

Terms and examples described above serve illustrative purposes only and are not intended to be limiting. For example, although the term "packet" or "data packet" is used to describe a unit of information in the processing and switching operations above, one skilled in the art would appreciate that information may be transmitted in other data unit forms including, by way of example and not limitation, a data packet or a frame. Some instances above describe information filtering for data originating from a source that has not yet obtained an IP address assignment, one skilled in the art would readily perceive that data can be filtered either to or from such a source.

As used herein, the term "embodiment" means an embodiment that serves to illustrate by way of example but not limitation. It may be noted that, in an embodiment, timestamps can be observed to measure roaming time.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method, comprising:
    receiving a data unit including layer 2 client-identification data;
    if the data unit does include layer 3 address data, forwarding the data unit, and if the included layer 3 address data confirms a layer 3 address assignment and if a layer 3 address assignment status restriction attribute associated with the received data unit is enabled, disabling the layer 3 address assignment status restriction attribute associated with the received data unit; and
    if the data unit does not include layer 3 address data and if the layer 3 address assignment status restriction attribute associated with the received data unit is enabled, discarding the data unit.

2. The method claim 1, further comprising:
    if the layer 3 address data does not confirm the layer 3 address assignment, forwarding the data unit.

3. The method of claim 1 further comprising: if the layer 2 client-identification data has been recorded, determining whether the layer 3 address assignment status restriction attribute associated with the received data unit is enabled.

4. The method of claim 1, wherein the data unit is a packet, further comprising preprocessing the packet.

5. The method of claim 1, further comprising executing switching functions with respect to the data unit.

6. A system comprising:
    a switching device configured to perform layer 2 functions and receive a data unit;
    a memory coupled to the switching device, the memory having a forwarding database storing an entry associated with the received data unit, the entry having an associated layer 2 address and a layer 3 address assignment status restriction attribute; and
    a processor coupled to the memory and the switching device, the processor configured to execute packet forwarding functions, if the received data unit includes layer 3 address data, the switching device forwards the data unit, and if the included layer 3 address data confirms a layer 3 address assignment and if the layer 3 address assignment status restriction attribute associated with the received data unit is enabled, disable the layer 3 address assignment status restriction attribute associated with the received data unit.

7. The system of claim 6, further comprising: a plurality of wireless access points coupled to the switching device.

8. The system of claim 6, further comprising: a plurality of clients coupled to the switching device through one or more wireless access points.

9. The system of claim 6, wherein the layer 2 address is a MAC address.

10. The system of claim 6, wherein the layer 3 address is an IP address.

11. The system of claim 6, wherein the data unit is a packet.

12. The system of claim 6, wherein the data unit is a frame.

13. The system of claim 6, wherein the entry of the forwarding database includes a port ID and a VLAN ID.

14. The system of claim 6, wherein the entry of the forwarding database includes an age parameter.

15. The system of claim 6, wherein if the layer 3 address assignment data does not confirm a layer 3 address assignment, the switching device forwards the data unit.

16. A system comprising:
    a switching device configured to perform layer 2 functions;
    a memory coupled to the switching device, the memory configured to have a forwarding database storing an entry associated with a received data, said entry having an associated layer 2 address and a layer 3 address assignment status restriction attribute associated with the received data; and
    an address restriction engine coupled to the memory and the switching device, the address restriction engine configured to execute packet forwarding and data traffic filtering functions, said address restriction engine having:
        an address status restriction module having control logic configured to manipulate a layer 3 address assignment status restriction attribute associated with the received data, and
        a packet forwarding module having logic configured to monitor data traffic and notify the address status restriction module that a first data with layer 3 address assignment data has been received;
        the address status restriction module configured to disable the layer 3 address assignment status restriction attribute associated with the first data if the layer 3 address assignment data confirms a layer 3 address assignment, based on a second data the address status restriction module receives from the packet forwarding module.

17. The system of claim 16, wherein the layer 2 address is a MAC address.

18. The system of claim 16, wherein the layer 3 address is an IP address.

19. The system of claim 16, wherein the switching device is configured to perform layer 3 functions.

* * * * *